United States Patent Office 3,793,397
Patented Feb. 19, 1974

3,793,397
PROCESS FOR THE PRODUCTION OF AMINOETHYLPIPERAZINE
Myrl Lichtenwalter, Austin, Tex., assignor to Jefferson Chemical Company, Inc., Houston, Tex.
No Drawing. Continuation-in-part of abandoned application Ser. No. 17,963, Mar. 9, 1970. This application July 12, 1972, Ser. No. 270,964
Claims priority, application Great Britain, Jan. 19, 1971, 2,491/71
Int. Cl. C07d 51/70
U.S. Cl. 260—288 SY                13 Claims

ABSTRACT OF THE DISCLOSURE

Aminoethylpiperazine (AEP) is produced by heating monoethanolamine (MEA) in the presence of ammonia and hydrogen in an aqueous medium over a hydrogenation catalyst. My invention is an improvement over this process wherein the production of AEP is maximized by recycling a portion of the product stream containing piperazine to the starting mixture. Aminoethylpiperazine is an epoxy resin curing agent; an intermediate in the preparation of corrosion inhibitors, asphalt additives, emulsion breakers, emulsifying agents, pharmaceuticals, dyes, textile chemicals, and surfactants.

---

This application is a continuation-in-part of application Ser. No. 17,963 filed Mar. 9, 1970, now abandoned.

BACKGROUND OF THE INVENTION

Field of the invention

This invention pertains to the field of amine production.

Description of the prior art

The production of aminoethylpiperazine by heating monoethanolamine in the presence of ammonia and hydrogen in an aqueous medium over a hydrogenation catalyst is well-known and is described, for example, in Moore et al.'s U.S. Pat. 3,269,999 (1966) and Moss et al.'s U.S. Pat. 3,037,023 (1962). It was unexpectedly discovered that the production of aminoethylpiperazine could be substantially increased by recycling a portion of the products to the starting reaction mixture.

SUMMARY OF THE INVENTION

Aminoethylpiperazine (AEP) is produced by heating monoethanolamine (MEA) in the presence of ammonia and hydrogen in an aqueous medium over a hydrogenation catalyst. An object of my invention is to maximize the production of AEP. My invention is an improvement over the above process wherein the production of AEP is maximized by recycling a portion of the product stream to the starting mixture.

DESCRIPTION OF THE PREFERRED EMBODIMENTS

The process is carried out under the general conditions specified in Moore et al.'s U.S. Pat. 3,269,999 (1966) and Moss et al.'s U.S. Pat. 3,037,023 (1962) for the production of aminoethylpiperazine and other amine products.

In accordance with this invention, monoethanolamine is heated in the presence of substantial amounts of ammonia; hydrogen and a hydrogenation catalyst and a portion of the product stream is recycled to this starting mixture. The process is generally conducted in an aqueous medium at an elevated temperature and pressure. The temperature and pressure may vary over a wide range. The reaction temperature may be between about 150° C. and about 400° C. although it has been found preferable to conduct the reaction between about 200° C. to 300° C. Desirably, this process is conducted under relatively high pressures ranging from about 30 to about 400 atmospheres with the preferred range between 65 to 225 atmospheres.

The molar ratio of ammonia to ethanolamine for this reaction may be in the range of 1:1 to 5:1. Normally, it will be in the order of about 2 to 3 mols of ammonia per mol of monoethanolamine.

Hydrogen is essential for this reaction and should amount to a substantial part of the reaction atmosphere. As a rule, there should be at least 10 and preferably between 20 and 200 atmospheres of hydrogen pressure employed.

The reaction is conducted in the presence of a hydrogenation catalyst. While a large number of hydrogenation catalysts may be employed, the preferred catalyst comprises one or more metals or oxides of copper, nickel and cobalt and chromium oxide. Despite the suitability of the oxides, however, it is preferred practice to employ the catalyst in a reduced form. A representative catalyst contains 70 to 80 mol percent nickel, 20 to 25 mol percent copper, and 1 to 5 mol percent chromium when calculated on an oxygen-free basis. The preferred catalyst may also be employed with a normally nonreducible metal oxide, for example, manganese oxide, molybdenum oxide, thorium oxide or an oxide of the rare earth metals. A specific preferred catalyst composition consists of 75% nickel oxide, 22% copper oxide and 3% chromium oxide.

The reaction products include a complex combination of amine compounds, water, and unreacted monoethanolamine. Piperazine is included in this amine product as well as aminoethylpiperazine and other low and high boiling products. Aminoethylpiperazine as well as other products may be removed from the product mixture by distillation. Any or all of the reaction products may be recycled to the starting mixture to increase the yield of aminoethylpiperazine. It is preferred to exclude from this recycle stream as much aminoethylpiperazine as possible. It is recognized that due to separation limitations some of the aminoethylpiperazine will probably be included in the recycle stream. If a portion or all of a particular product is needed as an end product it may be removed by distillation and the remaining products recycled. It is preferred to limit the recycled products to those boiling below about 180° C. in order to increase the rate of production of aminoethylpiperazine.

It is understood that it is within the scope of my invention to add products to the reactor from any source like those normally produced in this reaction. Thus the piperazine recycled in Examples III, IV and V below may also come from any other source and accomplish an object of the invention: to maximize the production of aminoethylpiperazine. So also with the recycle stream of Examples VI, VII, and VIII. The recycle method is preferred simply because it is normally the most convenient source of these materials.

The following examples were run in a commercial plant with the preferred aforementioned catalyst at about 166 atmospheres of pressure and all conditions were held as constant as possible except that in Examples III, IV and V product piperazine was recycled to the starting mixture and in Examples VI, VII and VIII other products were recycled as well as piperazine.

It is preferred, as demonstrated in the examples, that the recycle stream containing piperazine, or piperazine from other sources, be sufficiently provided such that the reactor feed composition contains in the range of about 10 to 35 wt. percent piperazine. It is, however, within the scope of this invention to recycle as much piperazine as desired and to continuously recycle piperazine to the extent that the piperazine is extinct. The 35 wt. percent

| Example number | Temp., °F. | Feed composition, lbs./100 lbs. feed | | | | | Product, lbs./100 lbs. product | | | | | Product, lb./100 lbs. feed: Net production (+) or disappearance (−) | | | | | Yield lbs./lbs. net MEA consumed | | Ratio of net AEP/PIP produced lb./lb., ΔAEP/ΔPIP | Recycle PIP/MEA (lb./lb.) | Recycle PIP plus DETA plus EDA/MEA (lb./lb.) |
|---|---|---|---|---|---|---|---|---|---|---|---|---|---|---|---|---|---|---|---|---|---|
| | | MEA[1] | PIP[2] | AEP[3] | DETA[4] | Other[5] | MEA | PIP | AEP | DETA | EDA | MEA | PIP | AEP | DETA | EDA | ΔPIP/ΔMEA | ΔAEP/ΔMEA | | | |
| I | 430 | 99.7 | 0 | 0 | 0 | .3 | 28.9 | 12.5 | 4.4 | 6.8 | 12.0 | −70.8 | +12.5 | +4.4 | +6.8 | +11.9 | .177 | 0.62 | .350 | 0 | 0 |
| II | 430 | 99.7 | 0 | 0 | 0 | .3 | 25.2 | 15.8 | 7.6 | 6.6 | 11.8 | −74.6 | +15.8 | +7.6 | +6.6 | +11.1 | .212 | .102 | .481 | 0 | 0 |
| III | 430 | 80.3 | 18.4 | 0 | 0 | 1.1 | 18.5 | 22.8 | 8.8 | 6.4 | 9.8 | −61.8 | +3.8 | +8.8 | +6.4 | +9.5 | .061 | .142 | 2.33 | .229 | .228 |
| IV | 430 | 82.4 | 17.1 | 0 | 0 | .4 | 16.4 | 25.9 | 10.1 | 5.1 | 9.6 | −66.0 | +8.8 | +10.1 | +5.1 | +9.6 | .133 | .153 | 1.15 | .208 | .205 |
| V | 430 | 88.0 | 11.0 | 0 | 0 | 1.0 | 18.1 | 19.4 | 9.5 | 5.3 | 10.1 | −69.9 | +8.4 | +9.5 | +5.3 | +9.6 | .120 | .136 | 1.13 | .125 | .125 |
| VI | 435 | 44.6 | 24.3 | 1.9 | 3.6 | 14.8 | 4.1 | 27.5 | 14.5 | 3.8 | 4.1 | −51.3 | +3.2 | +12.6 | — | −7.8 | −.062 | .246 | 3.97 | .439 | .66 |
| VII | 435 | 44.6 | 33.2 | 3.7 | 3.5 | 15.0 | 3.9 | 30.7 | 16.6 | 3.9 | 6.1 | −40.7 | −2.5 | +12.9 | −1.6 | −3.7 | .061 | .317 | — | .744 | 1.043 |
| VIII | 420 | 37.1 | 26.5 | 1.5 | 10.2 | 24.6 | 4.6 | 31.0 | 10.8 | 4.2 | 9.3 | −32.5 | +4.5 | +9.3 | −6.0 | −1.4 | −.138 | .286 | 2.07 | .714 | 1.278 |

[1] Monoethanolamine.
[2] Piperazine.
[3] N-aminoethylpiperazine.
[4] Diethylenetriamine.
[5] Primarily ethylenediamine (EDA).

upper piperazine limitation is thus only a practical limit indicating the concentration of piperazine where higher concentrations could cause freeze-ups in conventionally employed recycle equipment. The 10 wt. percent lower piperazine limitation is also a practical limit indicating economical and useful application of my invention. To achieve some practical advantage according to my invention, the piperazine content of the reactor feed contains at least more than 5 wt. percent piperazine.

The increase in production of aminoethylpiperazine compared to the total product weight as the products were recycled demonstrates the advantage of my invention.

I claim:

1. A method for improving the production of N-aminoethylpiperazine in a process where monoethanolamine, ammonia, and hydrogen are reacted over a hydrogenation catalyst the improvement which comprises adding to the starting mixture products produced in said process wherein said products are added to the starting mixture in an amount to provide a feed composition containing at least 5 wt. percent product piperazine.

2. The method of claim 1 wherein said containing at least 5 wt. percent product piperazine is an amount in the range of 10 to 3° wt. percent product piperazine.

3. The method of claim 1 wherein said containing at least 5 wt. percent product piperazine is an amount in the range of 11.0 to 32.2 wt. product piperazine.

4. The method of claim 1 wherein said hydrogenation catalyst contains (a) one or more metals or oxides of copper, nickel or cobalt, and (b) chromium oxide.

5. The method of claim 2 wherein said reacted is conducted at a temperature in the range of about 150° to 400° C. at 30 to 400 atmospheres of pressure which includes at least 10 atmospheres hydrogen and wherein the molar ratio of ammonia to monoethanolamine is in the range of about 1:1 to 5:1 and wherein said hydrogenation catalyst contains (a) one or more metals or oxides of copper, nickel, or cobalt, and (b) chromium oxide.

6. The method of claim 5 wherein said temperature is in the range of about 200° to 300° C. and said pressure is in the range of 65 to 225 atmospheres including about 20 to 200 atmospheres hydrogen.

7. The method of claim 3 wherein said reacted is conducted at a temperature in the range of about 150° to 400° C. at 30 to 400 atmospheres of pressure which includes at least 10 atmospheres hydrogen and wherein the molar ratio of ammonia to monoethanolamine is in the range of about 1:1 to 5:1 and wherein said hydrogenation catalyst contains (a) one or more metals or oxides of copper, nickel, or cobalt, and (b) chromium oxide.

8. The method of claim 7 wherein said temperature is in the range of about 200° to 300° C. and said pressure is in the range of 65 to 225 atmospheres including about 20 to 200 atmospheres hydrogen.

9. The method of claim 5 wherein said products added to the starting mixture consist of piperazine.

10. The method of claim 7 wherein said products added to the starting mixture consist of piperazine.

11. A method for producing N-aminoethylpiperazine comprising reacting in an aqueous medium a mixture of monoethanolamine, ammonia, hydrogen, and piperazine over a hydrogenation catalyst wherein said reacting is conducted at a a temperature within the range of 150° to 400° C., and a pressure in the range of 30 to 400 atmospheres which includes at least ten atmospheres hydrogen pressure, where the molar ratio of ammonia to monoethanolamine is in the range of 1:1 to 5:1 and the piperazine is employed in an amount to provide at least 5 wt. percent piperazine based on the total weight of the monoethanolamine and piperazine, and wherein said hydrogenation catalyst contains (a) one or more metals or oxides of copper, nickel, or cobalt, and (b) chromium oxide.

12. A method according to claim 11 wherein said at least 5 wt. percent piperazine is an amount in the range of 10 to 35 wt. percent piperazine.

13. A method according to claim 11 wherein said mixture consists of monoethanolamine, ammonia, hydrogen, and piperazine.

References Cited

UNITED STATES PATENTS

| | | | |
|---|---|---|---|
| 3,152,998 | 10/1964 | Moss | 260—268 SY |
| 3,269,999 | 8/1966 | Moore | 260—268 SY |
| 3,285,920 | 11/1966 | Mohlbayer | 260—268 SY |
| 3,297,700 | 11/1967 | Mohlbayer | 260—268 SY |
| 3,383,417 | 5/1968 | Lichtenwalter | 260—268 SY |
| 3,639,403 | 1/1972 | Mohlbayer | 260—268 SY |

DONALD G. DAUS, Primary Examiner

U.S. Cl. X.R.

260—585